United States Patent
Kanamaru et al.

(10) Patent No.: US 6,764,218 B2
(45) Date of Patent: Jul. 20, 2004

(54) SLIDE GUIDE DEVICE FOR PRESSES

(75) Inventors: Hisanobu Kanamaru, Sagamihara (JP); Takao Ito, Sagamihara (JP); Hiromichi Fujimori, Tokyo (JP)

(73) Assignee: Aida Engineering Co., Ltd., Kanagawa (JP)

(*) Notice: Subject to any disclaimer, the term of this patent is extended or adjusted under 35 U.S.C. 154(b) by 42 days.

(21) Appl. No.: 09/993,052

(22) Filed: Nov. 6, 2001

(65) Prior Publication Data

US 2002/0061144 A1 May 23, 2002

(30) Foreign Application Priority Data

Nov. 22, 2000 (JP) ........................................ 2000-355350

(51) Int. Cl.[7] .............................................. F16C 29/02
(52) U.S. Cl. .......................................... 384/38; 384/42
(58) Field of Search ............................. 384/42, 38, 39, 384/40, 41

(56) References Cited

U.S. PATENT DOCUMENTS

| 3,568,498 A | 3/1971 | Pearson ...................... 72/456 |
| 4,161,342 A | 7/1979 | Nelsen | |

FOREIGN PATENT DOCUMENTS

| DE | 2218438 | 10/1973 | .......... B30B/15/04 |
| DE | 39 35 787 | 5/1991 | .......... B30B/15/04 |
| EP | 0 360 875 | 4/1990 | .......... B30B/15/04 |
| JP | 2000288799 | 10/2000 | .......... B30B/15/04 |

*Primary Examiner*—Lenard A. Footland
(74) *Attorney, Agent, or Firm*—Darby & Darby

(57) ABSTRACT

A slide guide device for a press guides a slide in a cycle. The slide guide device eliminates eccentric force misalignment and prevents eccentric contact between the slide and a gib. The slide includes at least a first spherical shoe having at least a first guide surface. The gib includes at least a first sliding surface opposite the first guide surface. During operation, the spherical shoe rotates relative to the slide to provide automatic planar alignment between the first guide surface and the sliding surface. A wedge supports the gib to allow rapid and easy alignment with the slide.

18 Claims, 8 Drawing Sheets

SLIDE GUIDE DEVICE FOR PRESSES

BACKGROUND OF THE INVENTION

1. Field of the Invention

The present invention relates to a slide guide device for a press. More specifically, the present invention relates to a slide guide device that guides a slide

2. Description of the Related Art

Conventionally, a press includes a slide. A copper alloy liner serves as a slide surface. The press includes an iron gib disposed on a frame opposite the slide surface. During operation, the liner and the gib slide against each other to guide the slide along the frame.

Clearance between the liner and its facing gib is approximately 5/100 mm. Typically, a lubricating oil lubricates the sliding surfaces. The lubricating oil forms an oil membrane between the liner and the gib to minimize friction and wear.

Unfortunately, eccentric forces frequently occur in the press. These eccentric forces force the liner and gib to form 'line contacts.' Line contacts occur when failure of the lubricating oil membrane permits direct sliding contact to occur. Direct contact wears and scorches the sliding surfaces and increases the mechanical resistance to be overcome by the press motor. If not remedied, the line contacts cause motor failure and costly equipment damage.

Additionally, the clearance required to maintain an oil membrane is detrimental to high-precision goals. In particular with large high-precision presses with eccentric loads, the large slides maximize pressure with resulting detrimental line contacts. Conventionally, this detrimental effect is partially ameliorated through use of "two-point" and "four-point" press designs.

"Two-point" and "four-point" presses require costly precision construction. Production of precision parts is difficult, costly, and time consuming. Ultimately, no matter how precise the construction, eccentric loads may still cause line contacts between the liner and the gib.

The applicant's previously filed Japanese patent application number 2000-193782 partially overcomes this difficulty using a spherical surface block and a gib sliding against each other along a liner that has a V-shaped sliding surface. Unfortunately, aligning the V shape of the spherical surface block and the gib is difficult. Despite this design, ultimately during high loads the V-shaped surface of the spherical surface block spreads, causing damaging contact, costly repair and downtime.

OBJECTS AND SUMMARY OF THE INVENTION

An object of the present invention is to provide a slide guide device for a press that overcomes the problems and difficulties described above.

It is another object of the present invention to provide a slide guide device which improves uniform contact along each sliding surface.

It is another object of the present invention to provide a slide guide device which improves pressing precision and accuracy.

It is another object of the present invention to provide a slide guide device which compensates for eccentric forces during pressing and eliminates eccentric contact between each sliding surface.

It is another object of the present invention to provide a slide guide device that employs a gib structure using a rotatable element to maintain uniform contact between each sliding surface.

It is another object of the present invention to provide a slide guide device that is easily adjustable to set and fix an optimum gap between sliding surfaces.

It is another object of the present invention to provide a slide guide device which compensates for both lateral and eccentric loads during pressing operations and allows for simple assembly.

It is another object of the present invention to provide a slide guide device which has the foregoing features and capabilities.

The present invention relates to a slide guide device for a press which guides a slide in a cycle. The slide guide device eliminates misalignment caused by eccentric forces and prevents eccentric contact between the slide and a gib. The slide includes at least a first spherical shoe having at least a first guide surface. The gib includes at least a first sliding surface opposite the first guide surface. During operation, the spherical shoe rotates relative to the slide to ensure close alignment between the first guide surface and the sliding surface. A wedge supporting the gib allows rapid and easy alignment with the slide.

According to an embodiment of the present invention there is provided a slide guide device for a press machine, comprising: a slide, at least a first cavity on a first side of the slide, at least a first interface element, first means for rotatably retaining the first interface element in the first cavity, at least a first contact surface on the first interface element, at least a first gib opposite the slide and the first cavity, at least a first slide surface on the first gib, and first means for rotatably aligning the first contact surface with the first slide surface guiding and aligning the slide with the first gib during a cycle, thereby preventing an eccentric slide misalignment during the cycle and increasing press precision.

According to another embodiment of the present invention there is provided a slide guide device for a press machine, further comprising: at least a second cavity on a second side the slide, at least a second interface element, second means for rotatably retaining the second interface element in the second cavity, at least a second contact surface on the second interface element, at least a second gib opposite the slide and the second cavity, at least a second slide surface on the second gib, and second means for rotatably aligning the second contact surface with the second slide surface guiding and aligning the slide with the second gib during the cycle, thereby preventing the eccentric slide misalignment and increasing the press precision.

According to another embodiment of the present invention there is provided a slide guide device for a press machine, further comprising: at least a first clearance between the first contact surface and the first slide surface, at least a second clearance between the second contact surface and the second slide surface, and means for slidably adjusting and fixing the first and the second clearance and retaining each respective the first and the second clearance at a selected optimum clearance thereby maintaining alignment of the slide easily guiding the slide in the cycle.

According to another embodiment of the present invention there is provided a slide guide device for a press machine, wherein: the means for slidably adjusting and fixing includes the first gib, the first gib has at least a first wedge shape, at least a first support element in the means for slidably adjusting and fixing, the first support element between the first gib and a frame of the press machine, the first support element has a second wedge shape, the second wedge shape complementary to the first wedge shape, the first support element adjustable along the frame and fixable relative to the first gib and the frame, and the means for slidably adjusting and fixing effective to slide the first support element relative to the first gib and the frame, create the optimum clearance, and fix the first and the second clearance at the optimum clearance, whereby the slide easily maintains the optimum clearance during the cycle.

According to another embodiment of the present invention there is provided a slide guide device for a press machine, wherein: the at least first contact surface and the at least first slide surface are flat, the at least second contact surface and the at least second slide surface are flat, the first slide surface at a first angle to an axis of the slide, the axis extending linearly from the first gib, through the slide, to the second gib, and the second slide surface at a second angle to the axis of the slide.

According to another embodiment of the present invention there is provided a slide guide device for a press machine, wherein: the first slide surface is perpendicular to the axis, and the second slide surface is perpendicular to the axis.

According to another embodiment of the present invention there is provided a slide guide device for a press machine, further comprising: at least a third cavity on the first side of the slide, at least a third interface element, the first means for rotatably retaining also rotatably retaining the third interface element in the third cavity, at least a third contact surface on the third interface element, the first gib opposite the first and the third cavity, at least a third slide surface on the first gib, and the first means for rotatably aligning also rotatably aligning the third contact surface with the third slide surface during the cycle, thereby preventing the eccentric slide misalignment and a lateral slide misalignment during the cycle.

According to another embodiment of the present invention there is provided a slide guide device for a press machine, further comprising: at least a fourth cavity on the second side of the slide, at least a fourth interface element, the second means for rotatably retaining also rotatably retaining the fourth interface element in the fourth cavity, at least a fourth contact surface on the fourth interface element, the second gib opposite the second and the third cavity, at least a fourth slide surface on the second gib, and the second means for rotatably aligning also rotatably aligning the fourth contact surface with the fourth slide surface during the cycle, thereby preventing the eccentric slide misalignment and the lateral slide misalignment during the cycle.

According to another embodiment of the present invention there is provided a slide guide device for a press machine, further comprising: at least a third clearance between the third contact surface and the third slide surface, at least a fourth clearance between the fourth contact surface and the fourth slide surface, and means for slidably adjusting and fixing including means for slidably adjusting and fixing the third and the fourth clearance and retaining each respective the third and the fourth clearance at the selected optimum clearance thereby maintaining alignment of the slide in the cycle.

According to another embodiment of the present invention there is provided a slide guide device for a press machine, wherein: the at least third contact surface and the at least third slide surface are flat, the at least fourth contact surface and the at least fourth slide surface are flat, the first slide surface and the third slide surface at a third angle to the axis of the slide, and the second slide surface and the fourth slide surface at a fourth angle to the axis of the slide.

According to another embodiment of the present invention there is provided a slide guide device for a press machine, wherein: the third angle is a first acute angle, and the fourth angle is a second acute angle.

According to another embodiment of the present invention there is provided a slide guide device for a press machine, wherein: the third angle is a first obtuse angle, and the fourth angle is a second obtuse angle.

According to another embodiment of the present invention there is provided a slide guide device for a press machine, wherein: the first contact surface is at a first 120-degree angle to the third contact surface, and the second contact surface is at a second 120-degree angle to the fourth contact surface.

According to another embodiment of the present invention there is provided a slide guide device for a press machine, wherein: the first and the second 120-degree angles project away from the slide along the axis.

According to another embodiment of the present invention there is provided a slide guide device for a press machine, wherein: the first and the second 120-degree angles project toward the slide along the axis.

According to another embodiment of the present invention there is provided a slide guide device for a press machine, further comprising: at least a fifth contact surface on the first interface element, the first contact surface at a third obtuse angle to the fifth contact surface, at least a sixth contact surface on the second interface element, the second contact surface at a fourth obtuse angle to the sixth contact surface, a fifth slide surface on the first gib opposite the fifth contact surface, a sixth slide surface on the second gib opposite the sixth contact surface, the first means for rotatably aligning also including means for simultaneously and rotatably aligning the fifth contact surface with the fifth slide surface, and the second means for rotatably aligning also including means for simultaneously and rotatably aligning the sixth contact surface with the sixth slide surface.

According to another embodiment of the present invention there is provided a slide guide device for a press machine, wherein: the third obtuse angle is 120 degrees, and the fourth obtuse angle is 120 degrees.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
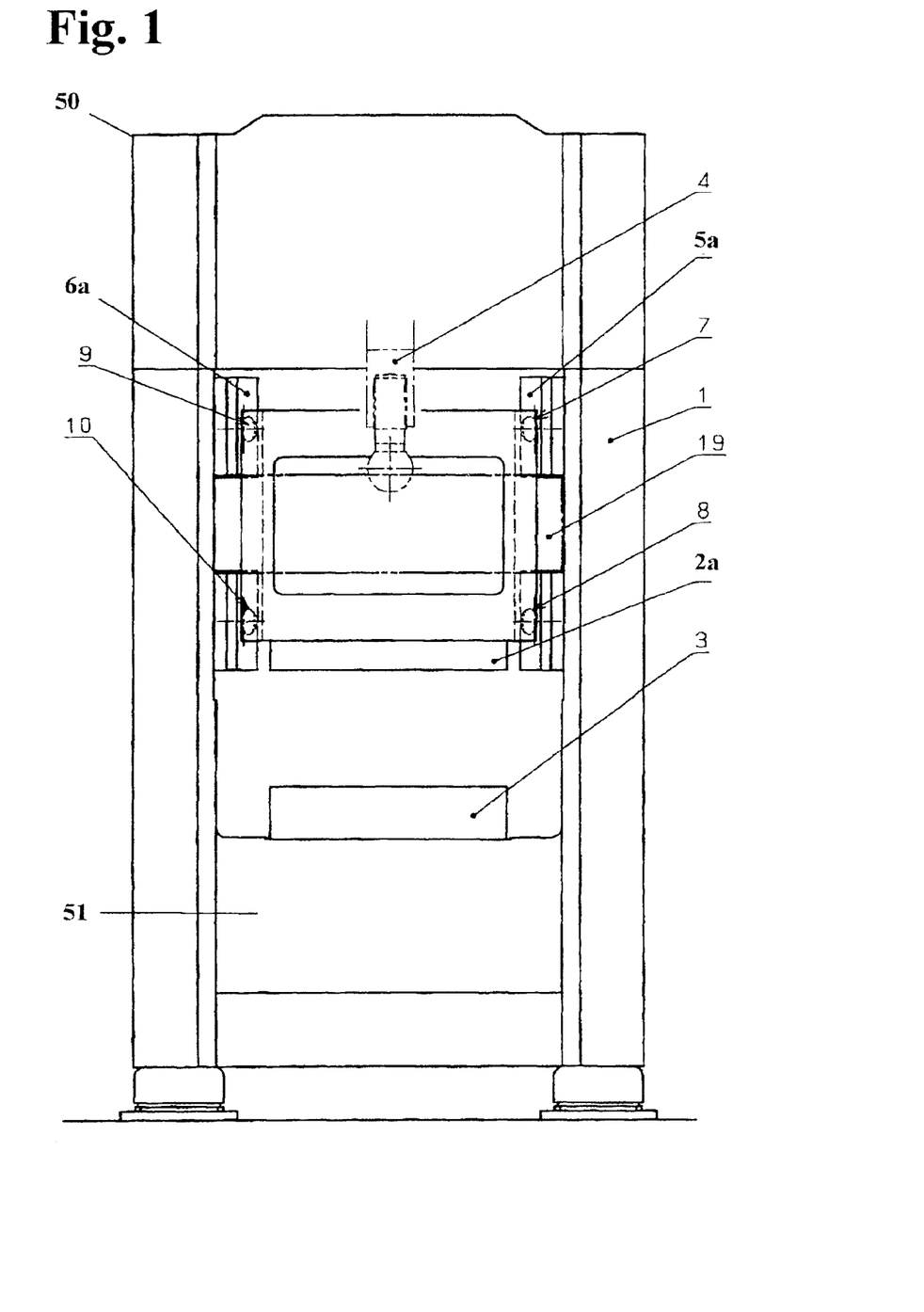
FIG. 1 is a front view of a press.
Figure 2:
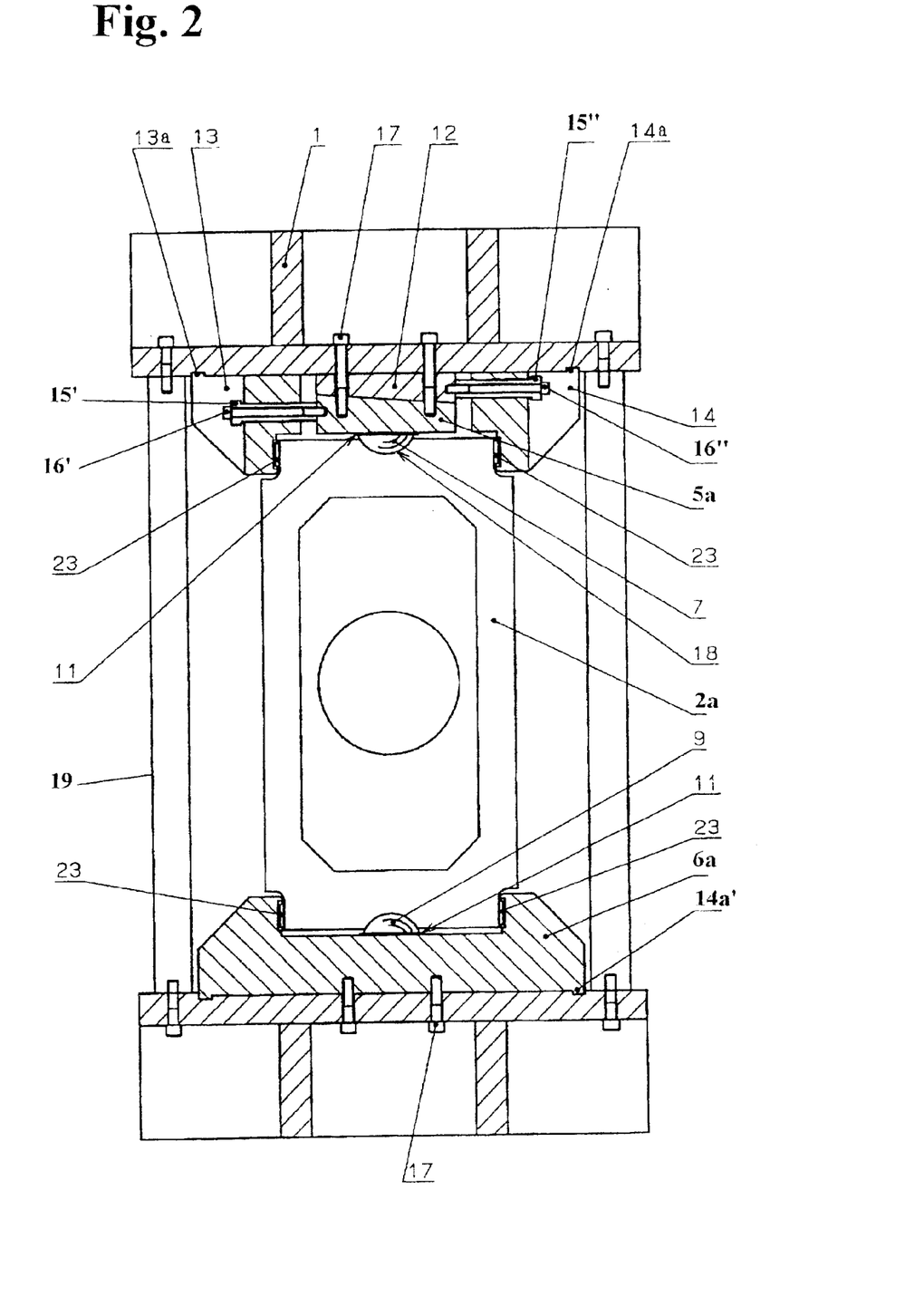
FIG. 2 is a horizontal cross-section of a gib in a first embodiment of the present invention.

Referring now to FIGS. 1 and 2, a press 50 includes a frame 1. Frame 1 supports a bed 51. Frame 1 includes a left side frame and a right side frame (both not numbered). A pair of stays 19 join the left side frame and the right side frame. Stays 19 provide additional stability to press 50 during operation.

A bolster 3 is disposed on bed 51 opposite slide 2a. A slide 2a is slidably operable along frame 1 relative to bolster 3 and to bed 51. Slide 2a is connected to a connecting rod 4 and a crank shaft (not shown). Connecting rod 4 and the crank shaft form a crank mechanism for operating slide 2a. During operation, the crank mechanism reciprocates slide 2a relative to bolster 3.

Stays 19 join frame 1 at a point roughly midway in a range of vertical motion of slide 2a. During pressing, stays 19 prevent deformation and torsion of frame 1.

A pair of gibs 5a, 6a on frame 1 are located on respective left and right side frame members opposite slide 2a. Spherical shoes 7, 8, 9, 10 are disposed on slide 2a, as will be explained. Spherical shoes 7, 8 and gib 5a are on a first side of slide 2a. Spherical shoes 9, 10 and gib 6a are on the second side of slide 2a. During operation, gibs 5a, 6a engage respective spherical shoes 7, 8, 9, 10 to guide slide 2a upward and downward on frame 1.

A pair of gib holders 13, 14 on frame 1 secure gib 5a relative to slide 2a, as will be explained.

An engagement section 13a is on gib holder 13. An engagement section 14a is on gib holder 14. Engagement sections 13a, 14a engage respective grooves (shown but not numbered) on frame 1. Engagement sections 13a, 14a align respective gib holders 13, 14 to frame 1. Bolts (not shown) secure gib holders 13, 14 to frame 1.

A hollow screw 15' is screwed into gib holder 13. A hollow screw 15" is screwed into gib holder 14. A bolt 16' extends through hollow screw 15'. A bolt 16" extends through hollow screw 15". Bolts 16', 16" secure hollow screws 15', 15" to respective gib holders 13, 14.

An end of bolt 16" extends through hollow screw 15" in gib holder 14. A wedge 12 threadably engages the end of bolt 16". Bolt 16" slidably retains wedge 12 relative to gib holders 13,14. During assembly or adjustment, hollow screw 15" and bolt 16" threadably control and position wedge 12 relative to gib holder 14.

An end of bolt 16' extends through hollow screw 15' in gib holder 13. Gib 5a threadably engages the end of bolt 16'. Bolt 16' slidably retains gib 5a relative to gibe holder 13. During assembly or adjustment, hollow screw 15' and bolt 16' threadably control and position gib 5a relative to gib holder 13.

Wedge 12, between gib 5a and frame 1, has a tapered shape that matches a tapered shape of gib 5a. Wedge 12 supports gib 5a. Wedge 12 and gib 5a slidably engage and allow easy adjustment of gib 5a relative to slide 2a. After assembly and adjustment, bolts 17 secure wedge 12 and gib 5a to frame 1.

A liner 11 is secured with at least one screw (not shown) on an outer surface of gib 5a between gib 5a and slide 2a. Liner 11 is typically a Teflon-based impregnated porous bi-metal, but may be any convenient wear resistant and slippery material. In this embodiment, liner 11 is plate-shaped affixed vertically along gib 5a.

At least one spherical cavity 18 is on slide 2a opposite gib 5a. Spherical cavity 18 has a concave hemispheric shape. Spherical shoe 7 is positioned in spherical cavity 18. Spherical shoe 7 has a convex hemispheric section which matches the concave hemispheric shape of spherical cavity 18.

Spherical shoe 7 has a flat section opposite the hemispheric section. During assembly, the flat section of spherical shoe 7 contacts liner 11. During operation, the flat section of spherical shoe 7 slidably contacts liner 11. During operation, when eccentric forces occur, the hemispheric section of spherical shoe 7 adjusts relative to spherical cavity 18 to maintain the flat section parallel to liner 11 and gib 5a, thereby eliminating line contacts.

Gib 6a is fixed relative to frame 1. In combination, gib 5a and gib 6a increase the operational precision of press 50 and guide slide 2a during a slide cycle.

An engagement section 14a' on gib 6a fits into at least one groove formed (shown but not numbered) in frame 1. During assembly, at least one additional bolt 17 secures gib 6a to frame 1.

Gibs 5a, 6a each include two corner guide surfaces (shown but not numbered) opposite slide 2a. The guide surfaces on gib 5a are opposite two respective corners of slide 2a. The guide surfaces on gib 6a are opposite the respective other two corners of slide 2a. During operation, the four corners of slide 2a operate parallel to their respective corner guide surface of gibs 5a, 6a.

A set of shoes 23 is affixed to slide 2a on each corner of slide 2a. Shoes 23 are opposite respective corner guide surface on gibs 5a, 6a. In the first embodiment of the present invention, slide 2a is easily and guidably restrained along a left/right axis by spherical shoes 7, 8, 9, and 10, and along a forward/back axis by shoes 23. As a result, precision operation is easily achieved without increased operational costs or the need for precision machining.

During assembly, bolt 17 secures gib 6a to frame 1. Spherical shoes 7, 8, 9, and 10 are installed within their respective cavities 18 on opposite sides of slide 2a. The now-assembled slide 2a is placed in frame 1 along gib 6a. Wedge 12 and gib 5a are assembled opposite slide 2. Wedge 12 and gib 5a are positioned and adjusted using respective hollow screws 15', 15" and bolts 16', 16" while maintaining even contact between liners 11 and spherical shoes 7, 8, 9, and 10. Finally, after positioning and adjusting, additional bolts 17 secure wedge 12 and gib 5a to frame 1.

Figure 3:
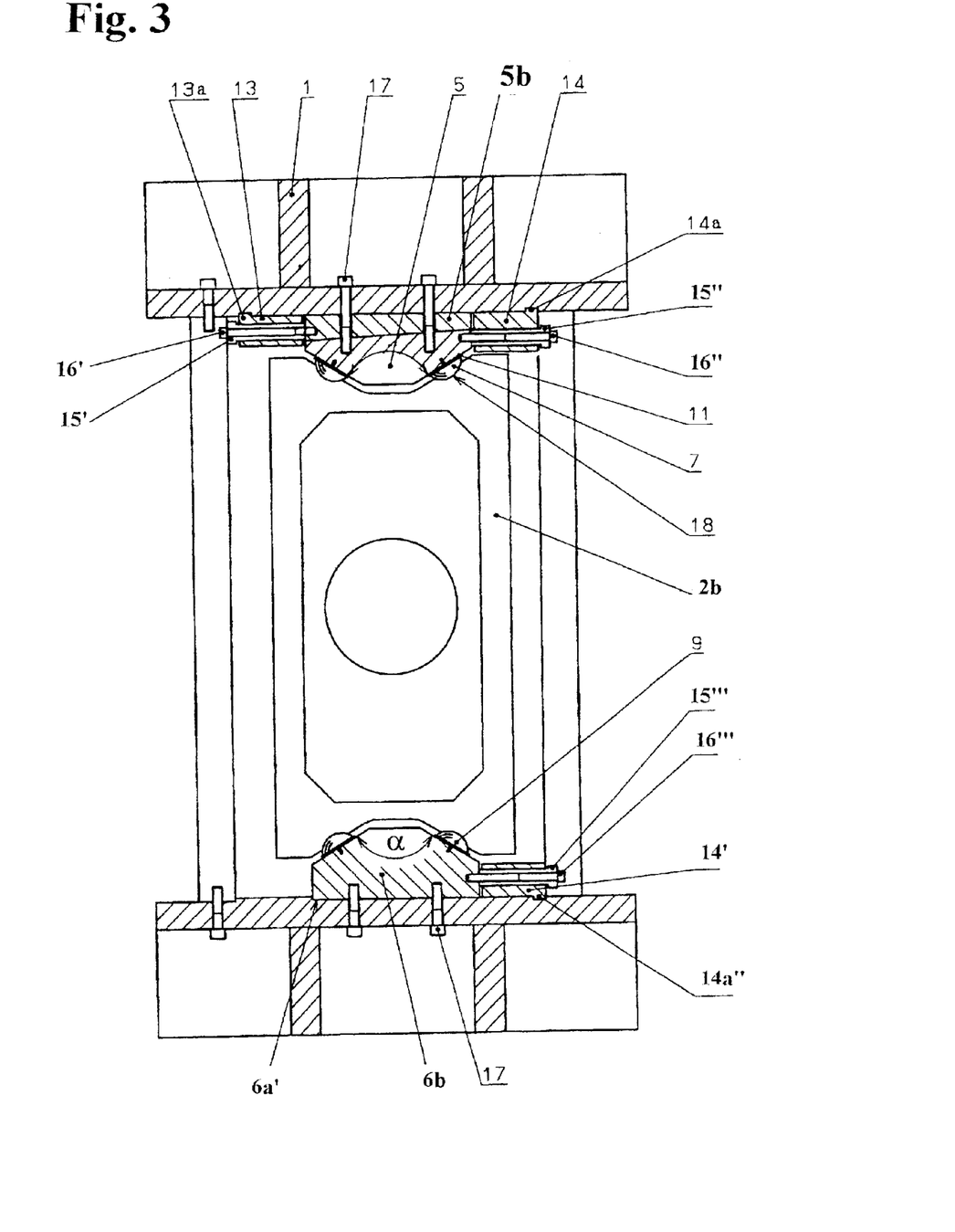
FIG. 3 is a horizontal cross-section of a gib in a second embodiment.
Figure 4:
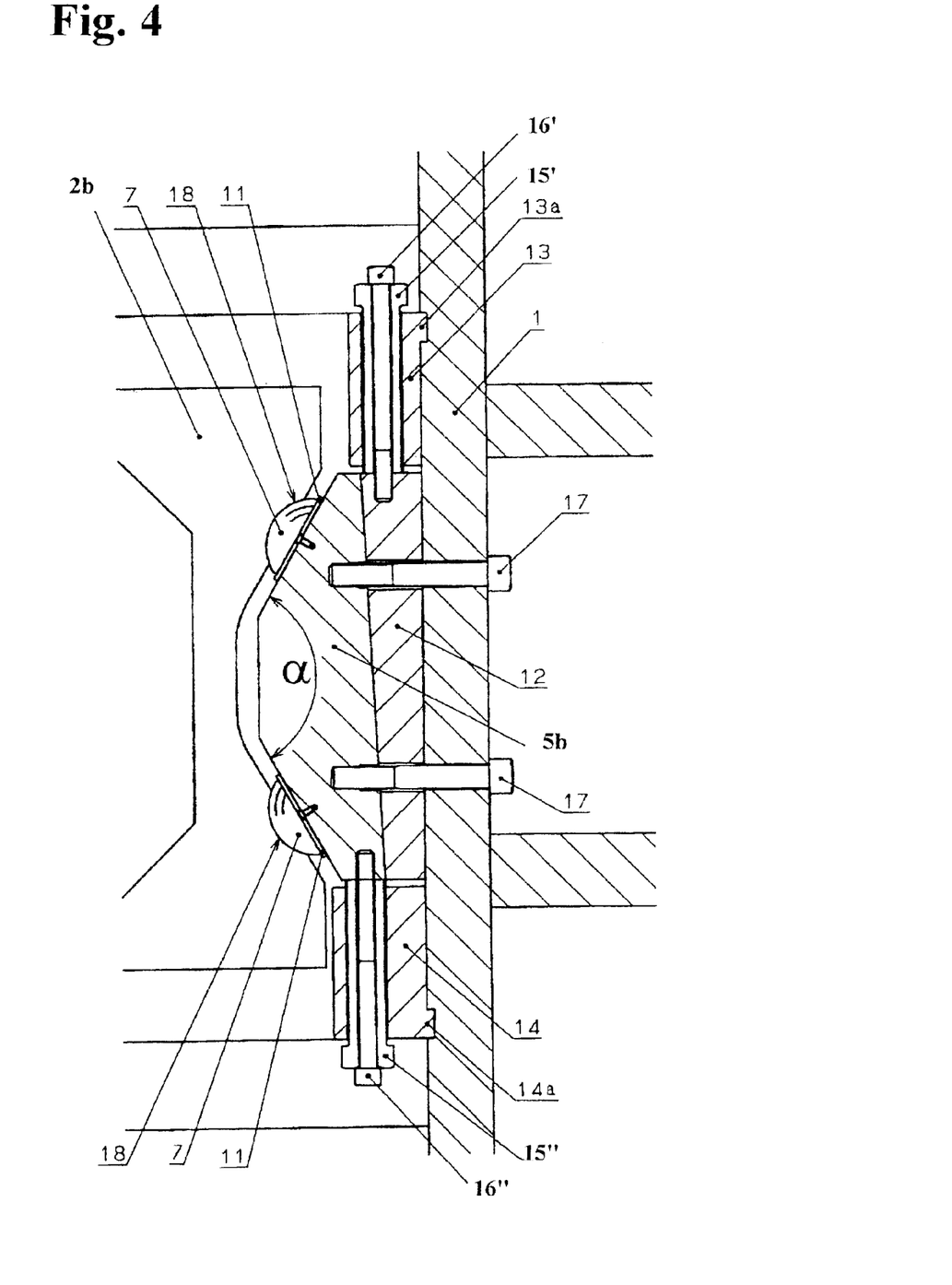
FIG. 4 is a detail drawing of a gib section in the second embodiment.

Referring now to FIGS. 3 and 4 a second alternative embodiment of the present invention includes a gib holder 14' and gib holders 13, 14. Engagement section 13a is located on gib holder 13. Engagement section 14a is located on gib holder 14. An engagement section 14a" is located on gib holder 14'.

Engagement sections 13a, 14a engage grooves (shown but not numbered) on one side of frame 1. Engagement sections 13a, 14a align respective gib holders 13, 14 to frame 1. Gib holders 13, 14 align and support a gib 5b, relative to frame Engagement section 14a" aligns gib holder 14' with frame 1. Gib holder 14' aligns and supports a gib 6b relative to frame 1. During operation, gibs 5b, 6b precisely and reliably guide slide 2b along frame 1, as will be explained.

Engagement section 14a" engages an engagement groove (shown but not numbered) on frame 1 opposite engagement sections 13a, 14a. A hollow screw 15''' threadably engages gib holder 14'. A bolt 16''' is inserted into hollow screw 15'''. An end of bolt 16''' threadably engages gib 6b to allow adjustment of gib 6b relative to frame 1. After adjustment, at least one bolt 17 fixes gib 6b to frame 1.

An abutting section 6a' on frame 1 opposite gib 6b resists pressure from bolt 16''' and supports gib 6b during assembly and operation.

In this embodiment, hollow screw 15' is screwed into gib holder 13. Hollow screw 15" is screwed into gib holder 14. Bolt 16' is inserted into hollow screw 15'. Bolt 16" is inserted into hollow screw 15".

An end of bolt 16' screws into wedge 12 to join gib holder 13 to wedge 12. During assembly, an end of hollow screw 15' helps to position wedge 12. Bolt 16' secures hollow screw 15' to gib holder 13. In combination, hollow screw 15' and bolt 16' secure wedge 12 relative to gib holder 13.

An end of bolt 16" is screwed into gib 5b to join gib holder 14 to gib 5b. During assembly, an end of hollow screw 15" positions gib 5b. Bolt 16" secures hollow screw 15" to gib 5b. In combination, hollow screw 15" and bolt 16" secure gib 5b relative to gib holder 14, wedge 12 and slide 2b. Once wedge 12 and gib 5b are positioned, at least one bolt 17 secures gib 5b and wedge 12 to frame 1.

A first pair of liners, 11, 11 are secured to gib 5b opposite slide 2b. A second pair of liners (not shown) is secured to gib 6b in a similar manner. Liners 11, 11 have plate-like shapes and are vertically affixed along gibs 5b, 6b.

Each gib 5b, 6b has two contact surfaces extending parallel along slide 2b. Liners 11 are located on the respective contact surface along gib 5b and 6b. Slide 2b has contact surfaces corresponding to the contact surfaces on gibs 5b, 6b. The contact surfaces on gibs 5b, 6b and slide 2b slide parallel to each other to allow easy and precise movement of slide 2b.

In this embodiment, pairs of spherical shoes 7, 7 and 9, 9 rotatably fit within corresponding spherical cavities 18 on slide 2b. The flat sections of spherical shoes 7, 7 contact liners 11 on gib 5b and slide freely. The flat sections of spherical shoes 9, 9 similarly contact liners 11 on gib 6b and slides freely. The spherical surface of spherical shoes 7, 7, and 9, 9 rotate within cavities 18 to allow the entire surface of their respective flat sections to remain parallel to their respective liners 11.

During assembly, the pairs of spherical shoes 7, 8, 9, 10 are fitted into corresponding cavities 18 on slide 2b. Gib 6b is adjusted and fixed to frame 1. Slide 2 is placed in frame 1. Wedge 12 and gib 5b are assembled, positioned, and adjusted using hollow screws 15', 15" and bolts 16', 16" while observing the contact between liners 11 and respective spherical shoes 7, 8, 9, and 10. After adjustment, bolts 17 secure wedge 12 and gib 5b to frame 1.

The contact surfaces on gibs 5b, 6b correspond to the surfaces of each pair of liners 11, 11. An angle alpha ($\alpha$) is an angle between the contact surface (and of the liners 11). Angle alpha ($\alpha$) is selected based upon the state of eccentric loads during pressing operations.

During operation, pressure (force) from slide 2b passes through respective spherical shoes 7, 8, 9, and 10 and is transferred to the contact surface of liners 11.

The forces acting on each contact surface can be analyzed, based on the slope of the contact surface. The forces can be broken down into a force providing restriction along a left-right axis of slide 2b and a force providing restriction along a forward-backward axis of slide 2b. Thus, slide 2b is restricted along the left-right axis and the forward-backward axis by gibs Sb, 6b.

In the present embodiment, angle alpha ($\alpha$) is approximately 120 deg. In this embodiment, the eccentric load along the left-right axis of slide 2b is larger than the eccentric load along the front-back axis. In other words, the projected area along the left-right axis of the guide surfaces is greater than that along the front-back axis. If angle alpha ($\alpha$) is 120 deg, the cosine and sine functions indicate that the ratio of projected areas is √3 (square root of 3): 1, i.e., approximately 1.7:1.

Figure 5:
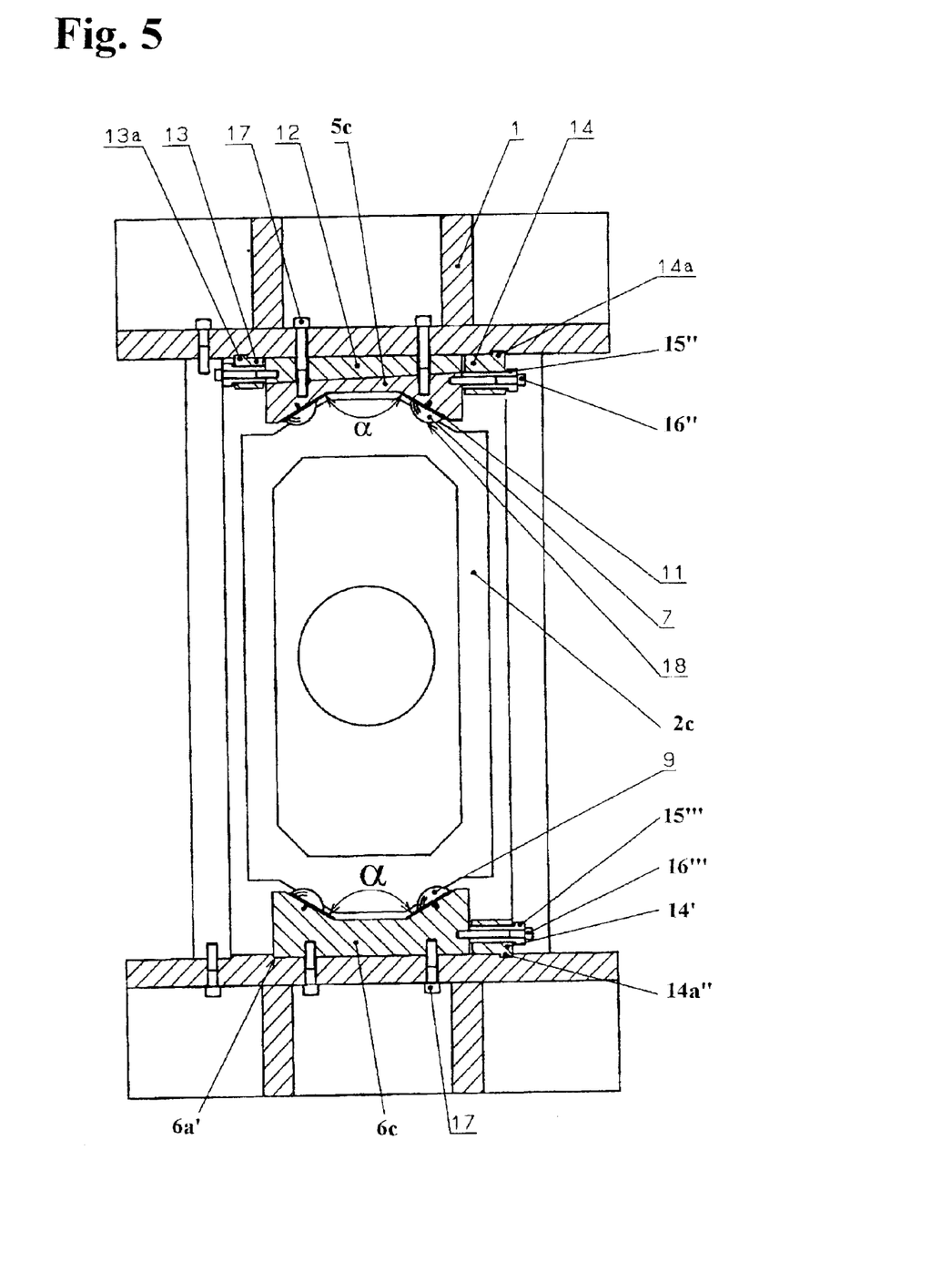
FIG. 5 is a horizontal cross-section of a gib in a third embodiment.
Figure 6:
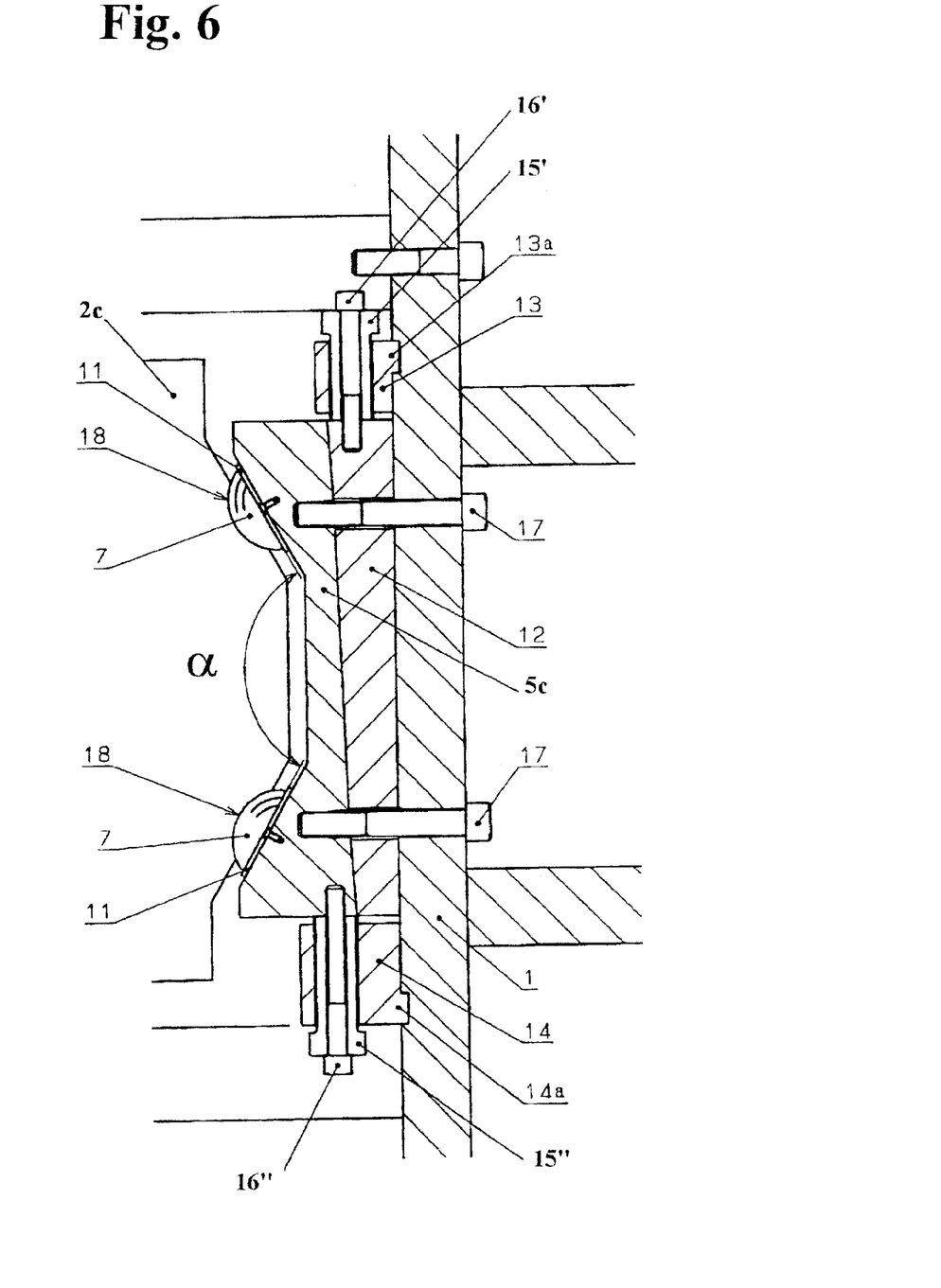
FIG. 6 is a detail drawing of a gib section in a third embodiment.

Referring now to FIG. 5 and FIG. 6, a third embodiment of the present invention includes a pair of gibs 5c, 6c. Gibs 5c, 6c have a generally concave shape relative to a slide 2c. As above, gibs 5c, 6c guide a slide 2c during pressing operations.

It should be noted that the difference between the second and the third embodiments of the present invention is that respective slides 2b, 2c have opposite (convex/concave) shapes relative to respective supporting gibs 5b, 6b and 5c, 6c. There are no other structural differences.

In the third embodiment, angle alpha ($\alpha$) between respective liners 11, 11 is also approximately 120 deg. During operation, where there is little temperature difference between slide 2c and gibs 5c, 6c, there is little beneficial difference between the second and the third embodiments.

However, a benefit does exist in the second embodiment when slide 2c reaches a temperature higher than a temperature of gibs 5c, 6c. Such a temperature difference permits thermal deformation of slide 2c that is greater than a thermal deformation of gibs 5c, 6c. In conditions of thermal anisotropy, the second embodiment provides greater compensation for thermal deformation. As a result, the present invention is easily adaptable to both precision pressing operations and variable operating environments.

Figure 7:
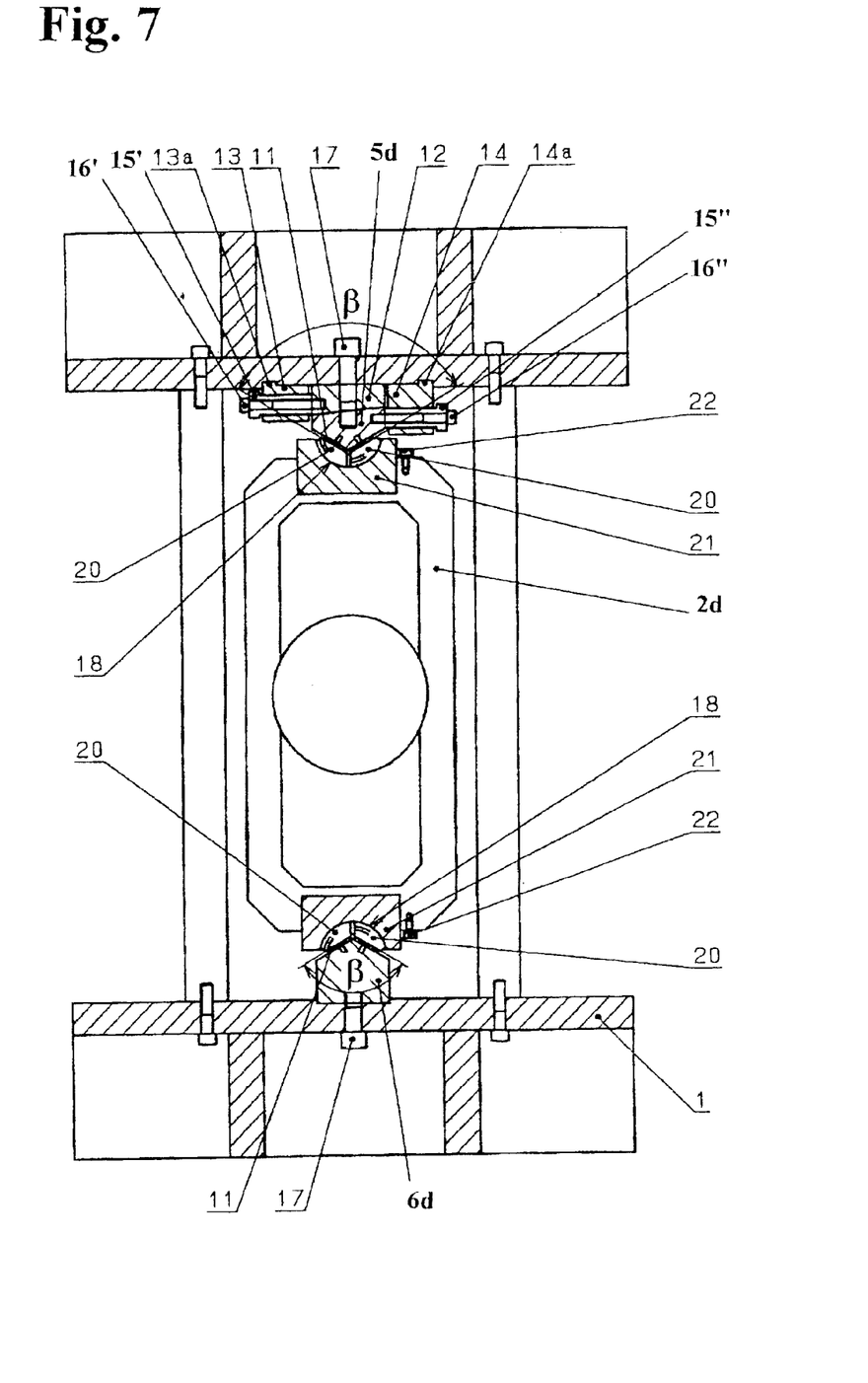
FIG. 7 is a horizontal cross-section of a gib in a fourth embodiment.
Figure 8:
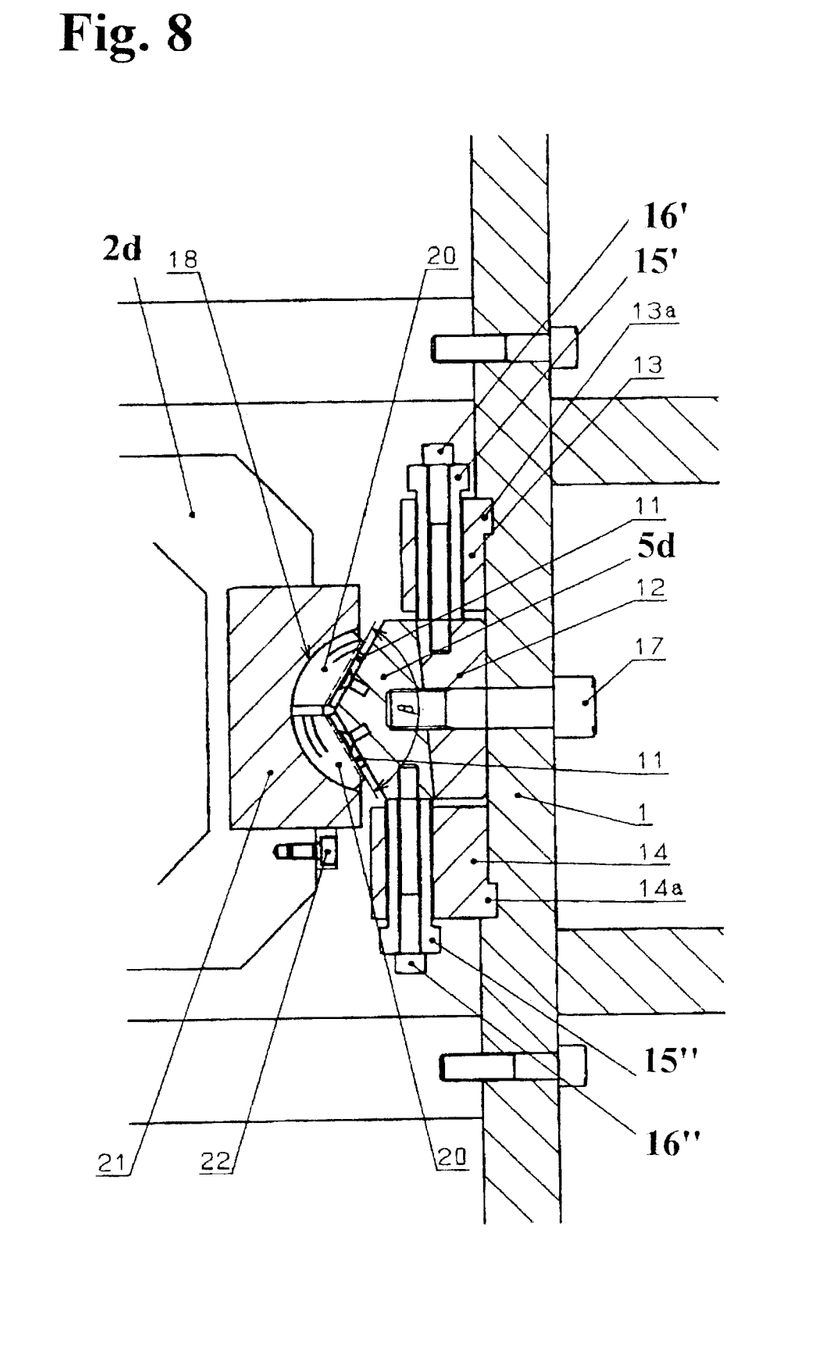
FIG. 8 is a detail drawing of a gib section in a fourth embodiment.

Referring now to FIGS. 7 and 8, a fourth embodiment of the present invention includes a slide 2d operating between a pair of gibs 5d, 6d.

A pair of bolt 17, 17 secures respective gib 5d, 6d to frame 1 on opposite sides of slide 2d. A set of screws (not shown) secure a set of liners 11, 11 to gib 6d. Another set of screws (not shown) secure a second set of liners 11, 11 to gib 5d. A bolt 22 secures each block 21, 21 to each side of slide 2d opposite respective gibs 5d, 6d.

Spherical cavities 18, 18 are disposed in respective blocks 21, 21. A spherical shoe 20 rotatably fits within each block 21. A flat sections on each spherical shoe 20, 20 allows sliding contact with respective liners 11, 11 on each gib 5d, 6d, as will be explained.

In this embodiment, gibs 5d, 6d and wedge 12 are narrower than in the previous embodiments. Similarly, gib holders 13, 14 are smaller in overall dimension. In the fourth embodiment, gib 6d sits in a groove (shown but not numbered) in frame 1. A single bolt 17 threadably secures gib 6d to frame 1 opposite slide 2d. A single bolt 17 similarly secures and fixes wedge 12 and gib 5d to frame 1.

An assembly method for the fourth embodiment is similar to the assembly methods for the second and third embodiments. During assembly of the fourth embodiment, bolts 22, 22 secure respective blocks 21, 21 to slide 2d. Spherical shoes 20, 20 are then inserted into respective cavities 18, 18. Gib 6 is secured to frame 1 and receives the assembled slide 2d. Gib holders 13, 14, wedge 12 and gib 5 are installed and adjusted. After adjustment, bolts 17 secure wedge 12 and gib 5d to frame 1.

During operation, gibs 5d, 6d are formed in a general 'V-shape.' A liner 11 is positioned on each side of the V-shape. Each shoe 20 provides two corresponding contact surfaces opposite each liner 11. An angle beta ($\beta$) is defined between each side of the V-shape. Angle beta ($\beta$) is approximately 120 degrees.

As an advantage, each shoe 20 replaces previous multiple shoes thereby reducing cost while maintaining precision. In other words, the multiple spherical shoes from the second and the third embodiments are moved as close together as possible and combined.

The fourth embodiment is particularly advantageous for providing precision operations where space is limited and press 50 or a slide 2d must be small.

In each embodiment discussed above, the combination of at least one spherical shoe 7–9 having a flat guide surface sliding along a corresponding gib operates as an easy means for eliminating eccentric force and slide misalignment.

The simple rotation of respective spherical shoes easily maintains planar contact between respective liners 11 and the contact surfaces of respective shoes. This design prevents the formation of line contacts, the breakdown of lubrication and minimizes scorching, scoring and equipment failure.

As an additional benefit to the present design, since gibs are easily adjusted to a clearance of roughly zero, high precision is easily achieved with no need for a strengthening guide post (not shown) on a die (not shown).

The present design allows easy adaptation to a variety of production sizes, processing needs, and temperature gradients all while maintaining high precision, simple manufacture, and simple assembly.

The present design also easily compensates for eccentric forces placed on the slide during regular operation. According to the present invention, the spherical shoes, corresponding cavities, and angular gib faces easily compensate for any eccentric force and maintain parallel operation. As a result, equipment life is extended, maintenance costs reduced, and on-stream time maximized.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the spirit and scope of this invention as defined in the following claims. In the claims, means-plus-function clauses are intended to cover the structures described or suggested herein as performing the recited function and not only structural equivalents but also equivalent structures. Thus, for example, although a nail, a screw, and a bolt may not be structural equivalents in that a nail relies entirely on friction between a wooden part and a cylindrical surface, a screw's helical surface positively engages the wooden part, and a bolt's head and nut compress opposite sides of at least one wooden part, in the environment of fastening wooden parts, a nail, a screw, and a bolt may be readily understood by those skilled in the art as equivalent structures.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A slide guide device for a press machine, comprising:
   a slide;
   at least a first spherical cavity on a first side of said slide;
   at least a first spherical shoe;
   said first spherical shoe being rotatably retained in said first spherical cavity;
   at least a first contact surface on said first spherical shoe;
   at least a first gib opposite said slide and said first spherical cavity;
   at least a first slide surface on said first gib; and
   said first contact surface being rotatably aligned with said first slide surface and said slide being guided and aligned with said first gib during a cycle, thereby preventing an eccentric slide misalignment during said cycle and increasing a press precision.

2. A slide guide device, according to claim 1, further comprising:
   at least a second spherical cavity on a second side of said slide;
   at least a second spherical shoe;
   said second spherical shoe being rotatably retained in said second spherical cavity;
   at least a second contact surface on said second spherical shoe;
   at least a second gib opposite said slide and said second spherical cavity;
   at least a second slide surface on said second gib; and
   said second contact surface being rotatably aligned with said second slide surface and said slide being guided and aligned with said second gib during said cycle, thereby preventing said eccentric slide misalignment and increasing said press precision.

3. A slide guide device, according to claim 2, further comprising:
   at least a first clearance between said first contact surface and said first slide surface;
   at least a second clearance between said second contact surface and said second slide surface; and
   means for slidably adjusting and fixing said first and said second clearance and retaining each respective said first and said second clearance at a selected optimum clearance, thereby maintaining an alignment of said slide and easily guiding said slide in said cycle.

4. A slide guide device, according to claim 3, wherein:
   said means for slidably adjusting and fixing includes said first gib;
   said first gib has at least a first wedge shape;
   at least a first support element in said means for slidably adjusting and fixing;
   said first support element between said first gib and a frame of said press machine;
   said first support element has a second wedge shape;
   said second wedge shape complementary to said first wedge shape;
   said first support element adjustable along said frame and fixable relative to said first gib and said frame; and
   said means for slidably adjusting and fixing effective to slide said first support element relative to said first gib and said frame, create said optimum clearance, and fix said first and said second clearance at said optimum clearance, whereby said slide easily maintains said optimum clearance during said cycle.

5. A slide guide device, according to claim 3, wherein:
   said at least first contact surface and said at least first slide surface are flat;
   said at least second contact surface and said at least second slide surface are flat;

said first slide surface at a first angle to an axis of said slide;

said axis extending linearly from said first gib, through said slide, to said second gib; and said second slide surface at a second angle to said axis of said slide.

6. A slide guide device, according to claim 5, wherein:

said first slide surface is perpendicular to said axis; and said second slide surface is perpendicular to said axis.

7. A slide guide device, according to claim 5, further comprising:

at least a third spherical cavity on said first side of said slide;

at least a third spherical shoe;

said third spherical shoe being rotatably retained in said third spherical cavity;

at least a third contact surface on said third spherical shoe;

said first gib opposite said first and said third spherical cavity;

at least a third slide surface on said first gib; and said third contact surface being rotatably aligned with said third slide surface during said cycle, thereby preventing said eccentric slide misalignment and a lateral slide misalignment during said cycle.

8. A slide guide device, according to claim 7, further comprising:

at least a fourth spherical cavity on said second side of said slide;

at least a fourth spherical shoe;

said fourth spherical shoe being rotatably retained in said fourth spherical cavity;

at least a fourth contact surface on said fourth spherical shoe;

said second gib opposite said second and said third spherical cavity;

at least a fourth slide surface on said second gib; and said fourth contact surface being rotatably aligned with said fourth slide surface during said cycle, thereby preventing said eccentric slide misalignment and said lateral slide misalignment during said cycle.

9. A slide guide, according to claim 8, further comprising:

at least a third clearance between said third contact surface and said third slide surface;

at least a fourth clearance between said fourth contact surface and said fourth slide surface; and means for slidably adjusting and fixing including means for slidably adjusting and fixing said third and said fourth clearance and retaining each respective said third and said fourth clearance at said selected optimum clearance thereby maintaining alignment of said slide in said cycle.

10. A slide guide device, according to claim 9, wherein:

said at least third contact surface and said at least third slide surface are flat;

said at least fourth contact surface and said at least fourth slide surface are flat;

said first slide surface and said third slide surface at a third angle to said axis of said slide; and said second slide surface and said fourth slide surface at a fourth angle to said axis of said slide.

11. A slide guide device, according to claim 10, wherein:

said third angle is a first acute angle; and said fourth angle is a second acute angle.

12. A slide guide device, according to claim 10, wherein:

said third angle is a first obtuse angle; and said fourth angle is a second obtuse angle.

13. A slide guide device, according to claim 10, wherein:

said first contact surface is at a first 120-degree angle to said third contact surface; and said second contact surface is at a second 120-degree angle to said fourth contact surface.

14. A slide guide device, according to claim 13, wherein:

said first and said second 120-degree angle project away from said slide along said axis.

15. A slide guide device, according to claim 13, wherein:

said first and said second 120-degree angle project toward said slide along said axis.

16. A slide guide device, according to claim 5, further comprising:

at least a fifth contact surface on said first interface element;

said first contact surface at a third obtuse angle to said fifth contact surface;

at least a sixth contact surface on said second interface element;

said second contact surface at a fourth obtuse angle to said sixth contact surface;

a fifth slide surface on said first gib opposite said fifth contact surface;

a sixth slide surface on said second gib opposite said sixth contact surface;

said first means for rotatably aligning also including means for simultaneously and rotatably aligning said fifth contact surface with said fifth slide surface; and said second means for rotatably aligning also including means for simultaneously and rotatably aligning said sixth contact surface with said sixth slide surface.

17. A slide guide device, according to claim 16, wherein:

said third obtuse angle is 120 degrees; and said fourth obtuse angle is 120 degrees.

18. A slide guide device for a press machine, comprising:

a slide;

at least a first spherical cavity on a first side of said slide;

at least a first spherical shoe;

said first spherical shoe being rotatably retained in said first spherical cavity;

at least a first contact surface on said first spherical shoe;

at least a first gib opposite said slide and a concave side of said first spherical cavity;

at least a first slide surface on said first gib; and said first contact surface being rotatably aligned with said first slide surface and said slide being guided and aligned with said first gib during a cycle, thereby preventing an eccentric slide misalignment during said cycle and increasing a press precision.

* * * * *

UNITED STATES PATENT AND TRADEMARK OFFICE
CERTIFICATE OF CORRECTION

| | | |
|---|---|---|
| PATENT NO. | : 6,764,218 B2 | Page 1 of 1 |
| APPLICATION NO. | : 09/993052 | |
| DATED | : July 20, 2004 | |
| INVENTOR(S) | : Hisanobu Kanamaru et al. | |

It is certified that error appears in the above-identified patent and that said Letters Patent is hereby corrected as shown below:

In the drawings, Sheet 3, Figure 3, please delete reference numeral "5b" and insert reference numeral --12 --.

In the drawings, Sheet 3, Figure 3, please delete reference numeral "5" and insert reference numeral -- 5b --.

In the drawings, Sheet 3, Figure 3, please apply reference item -- α -- to the curved arrow located on the upper portion of the Figure near reference numeral "18".

At Column 8, Line 42, please delete the word "sections" and insert the word -- section --.

At Column 8, Line 64, please delete the phrase "Each shoe 20 provides" and insert the phrase -- The shoes 20, 20 provide --.

At Column 9, line 10, please delete the phrase "shoe 7-9" and insert the phrase -- shoe 7-10, 20 --.

Signed and Sealed this

Fourth Day of September, 2007

JON W. DUDAS
*Director of the United States Patent and Trademark Office*